United States Patent
Hayakawa et al.

(10) Patent No.: US 10,932,000 B2
(45) Date of Patent: Feb. 23, 2021

(54) DATA PROCESSING DEVICE, DATA PROCESSING METHOD, AND DATA PROCESSING SYSTEM

(71) Applicant: SONY SEMICONDUCTOR SOLUTIONS CORPORATION, Kanagawa (JP)

(72) Inventors: Tomonobu Hayakawa, Kanagawa (JP); Hsingying Ho, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/609,290

(22) PCT Filed: May 11, 2018

(86) PCT No.: PCT/JP2018/018246
§ 371 (c)(1),
(2) Date: Oct. 29, 2019

(87) PCT Pub. No.: WO2018/216499
PCT Pub. Date: Nov. 29, 2018

(65) Prior Publication Data
US 2020/0077140 A1   Mar. 5, 2020

(30) Foreign Application Priority Data

May 26, 2017  (JP) .............................. JP2017-104132

(51) Int. Cl.
*H04N 5/77* (2006.01)
*H04N 21/439* (2011.01)
(Continued)

(52) U.S. Cl.
CPC ..... *H04N 21/4394* (2013.01); *G10L 21/0224* (2013.01); *G10L 21/055* (2013.01);
(Continued)

(58) Field of Classification Search
CPC ............... H04N 9/8063; H04N 9/8211; H04N 2201/3264; H04N 21/439;
(Continued)

(56) References Cited

U.S. PATENT DOCUMENTS

2009/0269029 A1*  10/2009  Ishikawa ................ H04N 5/765
                                                          386/239
2010/0067798 A1*  3/2010  Hung ................. G06K 9/00268
                                                          382/190

FOREIGN PATENT DOCUMENTS

| JP | 2007-166042 A | 6/2007 |
| JP | 2011-003991 A | 1/2011 |
| JP | 2016-090774 A | 5/2016 |

OTHER PUBLICATIONS

International Search Report and Written Opinion of PCT Application No. PCT/JP2018/018246, dated Jul. 10, 2018, 07 pages of ISRWO.

* cited by examiner

*Primary Examiner* — Robert Chevalier
(74) *Attorney, Agent, or Firm* — Chip Law Group

(57) ABSTRACT

Provided is a data processing device that includes a sound extracting unit that extracts one or more sound blocks to be reproduced together with video data based on the plurality of images, on the basis of a predetermined characteristic quantity from sound data corresponding to sound captured within a period in which a plurality of intermittent images has been captured.

17 Claims, 9 Drawing Sheets

(51) Int. Cl.
  *G10L 21/0224*  (2013.01)
  *G10L 21/055*  (2013.01)
  *H04N 5/915*  (2006.01)
  *H04N 5/926*  (2006.01)
  *H04N 9/80*  (2006.01)

(52) U.S. Cl.
  CPC ............... *H04N 5/77* (2013.01); *H04N 5/915* (2013.01); *H04N 5/926* (2013.01); *H04N 21/4398* (2013.01)

(58) Field of Classification Search
  CPC ......... H04N 21/42203; H04N 21/4223; H04N 21/4394; H04N 21/4398; H04N 21/4307; H04N 21/4334; H04N 21/8547; H04N 5/77; H04N 5/915; H04N 5/926; H04N 9/806; H04R 2430/23; G10L 21/055; G10L 21/0224; G11B 20/10
  USPC .......................... 386/224, 226, 248, 285, 278
  See application file for complete search history.

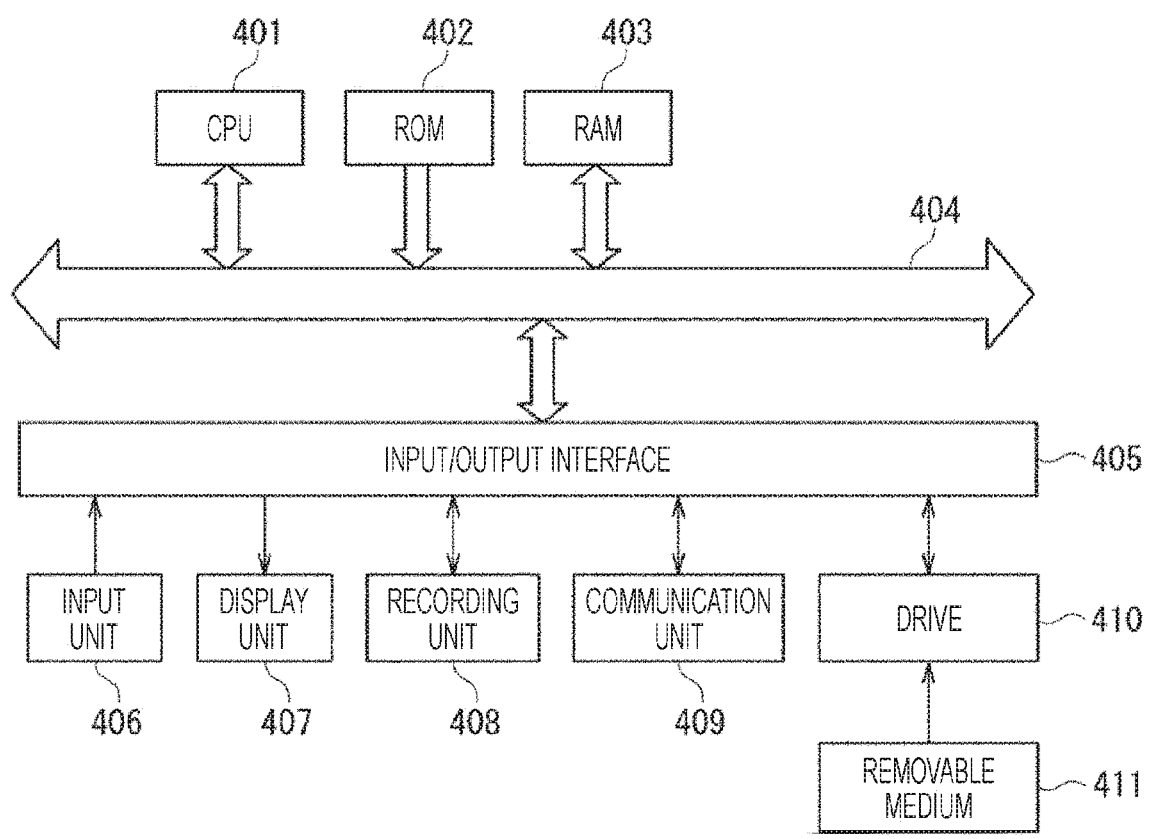

DATA PROCESSING DEVICE, DATA PROCESSING METHOD, AND DATA PROCESSING SYSTEM

CROSS REFERENCE TO RELATED APPLICATIONS

This application is a U.S. National Phase of International Patent Application No. PCT/JP2018/018246 filed on May 11, 2018, which claims priority benefit of Japanese Patent Application No. JP 2017-104132 filed in the Japan Patent Office on May 26, 2017. Each of the above-referenced applications is hereby incorporated herein by reference in its entirety.

TECHNICAL FIELD

The present technology relates to data processing devices, data processing methods, programs, and data processing systems, and more particularly to a data processing device, a data processing method, a program, and a data processing system suitable for use in a case where intermittent images are recorded.

BACKGROUND ART

In the related art, devices capable of performing interval imaging, in which images are intermittently captured at predetermined intervals, are widely in use.

Meanwhile, in the related art, there has been proposed a video-sound recording device capable of separately setting a time zone for recording video and a time zone for recording the sound, and recording both the video and the sound or recording only one of the video and the sound for each time zone (see, for example, Patent Document 1).

CITATION LIST

Patent Document

Patent Document 1: Japanese Patent Application Laid-Open No. 2007-166042

SUMMARY OF THE INVENTION

Problems to be Solved by the Invention

However, in a case where images and the sound are captured synchronously at the time of interval imaging, it is not always possible to record meaningful sound since the sound is captured intermittently. Moreover, it is difficult for a person to recognize the content of sound recorded in synchronization with an image since recording time of an image for one frame is quite short.

Furthermore, the invention disclosed in Patent Document 1 does not make any consideration to recording meaningful sound in interval imaging.

The present technology has been made in view of such circumstances, and is capable of recording meaningful sound for intermittent images.

Solutions to Problems

A data processing device according to a first aspect of the present technology includes: a sound extracting unit that extracts one or more sound blocks to be reproduced together with video data based on the plurality of images, on the basis of a predetermined characteristic quantity from first sound data corresponding to sound captured within a first period in which a plurality of intermittent images has been captured.

A data processing method according to a first aspect of the present technology includes: a sound extracting step of extracting one or more sound blocks to be reproduced together with video data based on the plurality of images, on the basis of a predetermined characteristic quantity from sound data corresponding to sound captured within a period in which a plurality of intermittent images has been captured.

A program according to a first aspect of the present technology causes the computer to execute processing including a sound extracting step of extracting one or more sound blocks to be reproduced together with video data based on the plurality of images, on the basis of a predetermined characteristic quantity from sound data corresponding to sound captured within a period in which a plurality of intermittent images has been captured.

A data processing system according to a second aspect of the present technology includes: a sound extracting unit that extracts one or more sound blocks to be reproduced together with video data based on the plurality of images, on the basis of a predetermined characteristic quantity from first sound data corresponding to sound captured within a period in which a plurality of intermittent images has been captured; a sound processing unit that processes the extracted sound blocks to generate second sound data having a same length as that of the video data; and a video/sound data generating unit that multiplexes the video data and the second sound data to generate video/sound data, in which the sound extracting unit, the sound processing unit, and the video/sound data generating unit are distributed to multiple devices.

In the first aspect of the present technology, one or more sound blocks to be reproduced together with video data based on the plurality of images are extracted on the basis of a predetermined characteristic quantity from sound data corresponding to sound captured within a period in which a plurality of intermittent images has been captured.

In the second aspect of the present technology, one or more sound blocks to be reproduced together with video data based on the plurality of images are extracted on the basis of a predetermined characteristic quantity from first sound data corresponding to sound captured within a period in which a plurality of intermittent images has been captured, the extracted sound blocks are processed, second sound data having a same length as that of the video data is generated, and the video data and the second sound data are multiplexed to generate video/sound data.

Effects of the Invention

According to the first aspect or the second aspect of the present technology, it is possible to record meaningful sound for intermittent images.

Note that the effects described herein are not necessarily limited. Effects exerted may be any one of the effects described in the present disclosure.

BRIEF DESCRIPTION OF DRAWINGS

FIG. 9 is a diagram illustrating an exemplary configuration of a computer.

MODE FOR CARRYING OUT THE INVENTION

Embodiments for carrying out the present technology will be described below. Explanation will be given in the order below.
1. First Embodiment (Example of Recording Device)
2. Second Embodiment (Example of Editing Device)
3. Variations
4. Others 1. First Embodiment First, a first embodiment of the present technology will be described with reference to FIGS. 1 to 7.

Exemplary Configuration of Recording Device

Figure 1:
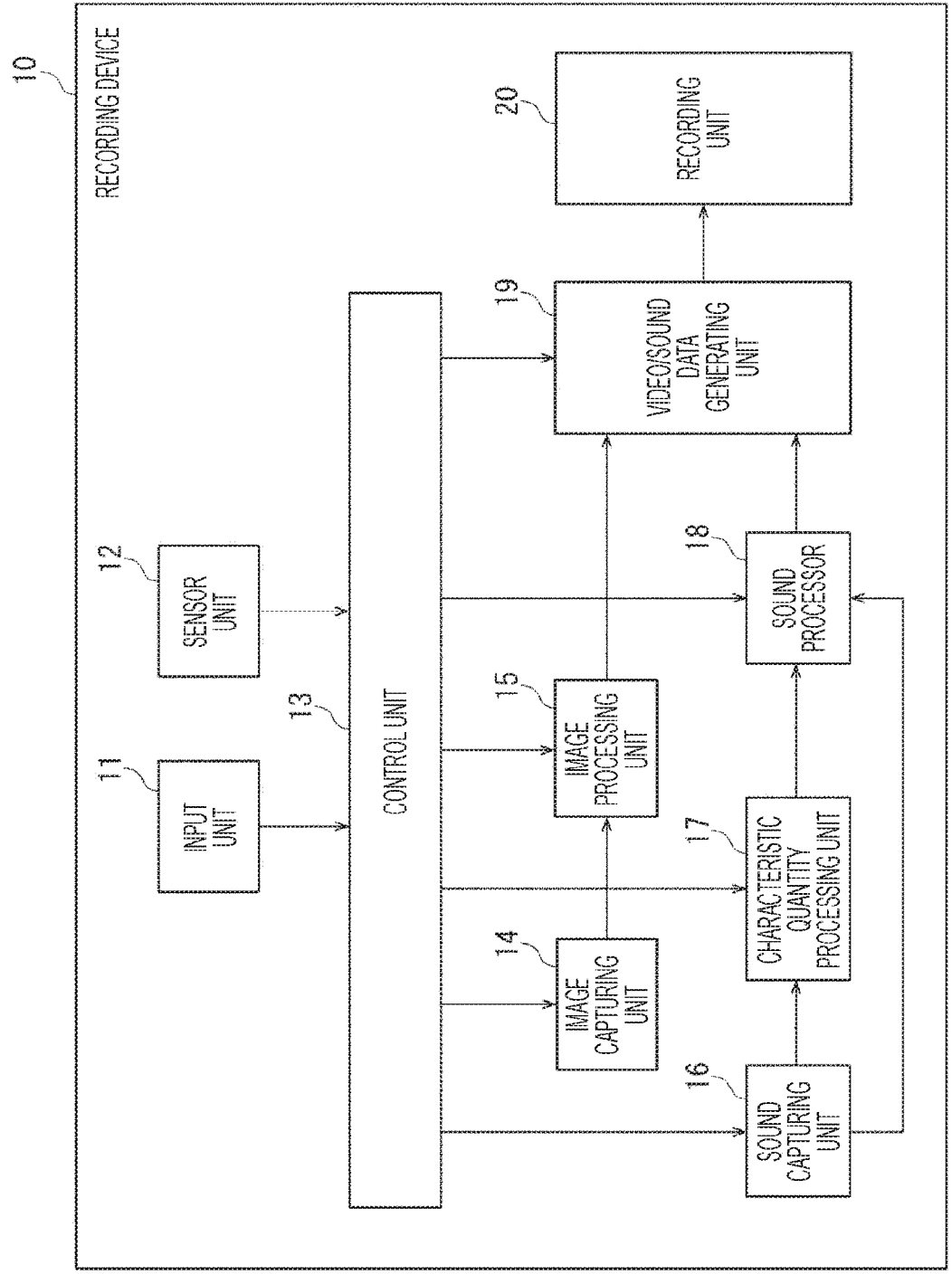
FIG. 1 is a block diagram illustrating an embodiment of a recording device to which the present technology is applied.

FIG. 1 is a block diagram illustrating a configuration example of a recording device 10 which corresponds to a first embodiment of a data processing device to which the present technology is applied.

The recording device 10 captures images and sound, and generates and records video/sound data based on the captured images and sound.

The recording device 10 is also capable of recording video/sound data in at least two modes of a normal recording mode and an interval recording mode. In the normal recording mode, images are consecutively captured at a high frame rate (e.g. 30 fps) to record video/sound data. In the interval recording mode, images are intermittently captured at predetermined intervals at a low frame rate (e.g. 1 fps) to record video/sound data.

The recording device 10 includes an input unit 11, a sensor unit 12, a control unit 13, an image capturing unit 14, an image processing unit 15, a sound capturing unit 16, a characteristic quantity processing unit 17, a sound processor 18, a video/sound data generating unit 19, and a recording unit 20.

The input unit 11 includes an operation device for operating the recording device 10 or an input device for inputting data. The input unit 11 supplies an operation signal corresponding to user operation or data input from the outside to the control unit 13.

The sensor unit 12 includes various sensors necessary for processing in the recording device 10. For example, the sensor unit 12 includes an acceleration sensor, a gyro sensor, a vibration sensor, and a motion sensor. The sensor unit 12 supplies sensor data output from each of the sensors to the control unit 13 together with time information at which the data was obtained.

The control unit 13 includes, for example, various processors such as a CPU, and controls the respective units of the recording device 10.

The image capturing unit 14 includes, for example, a camera module and captures an image. The image capturing unit 14 supplies image data corresponding to the captured image to the image processing unit 15.

The image capturing unit 14 is also capable of performing consecutive imaging in which images are consecutively captured at a high frame rate (e.g. 30 fps) and interval imaging (or time-lapse imaging) in which images are intermittently captured at a low frame rate (e.g. 1 fps).

The image processing unit 15 performs various types of image processing on the image data supplied from the image capturing unit 14 as required, and supplies the processed image data to the video/sound data generating unit 19.

The sound capturing unit 16 includes, for example, a microphone and captures the sound. The sound capturing unit 16 supplies sound data corresponding to the captured sound to the characteristic quantity processing unit 17 or the sound processor 18.

The characteristic quantity processing unit 17 extracts the characteristic quantity of the sound data and performs filtering processing of the sound data on the basis of the extracted characteristic quantity. As a result, a part of the sound data is supplied to the sound processor 18, and the rest is discarded.

The sound processor 18 performs various types of sound processing on the sound data supplied from the sound capturing unit 16 or the characteristic quantity processing unit 17 as necessary, and supplies the processed sound data to the video/sound data generating unit 19.

The video/sound data generating unit 19 generates video/sound data on the basis of the video data based on the image data supplied from the image processing unit 15 and the sound data supplied from the sound processor 18, and performs processing for recording the video/sound data in the recording unit 20.

The recording unit 20 includes, for example, a recording medium such as a magnetic disk, an optical disk, a magneto-optical disk, or a semiconductor memory.

Exemplary Configuration of Characteristic Quantity Processing Unit

Figure 2:
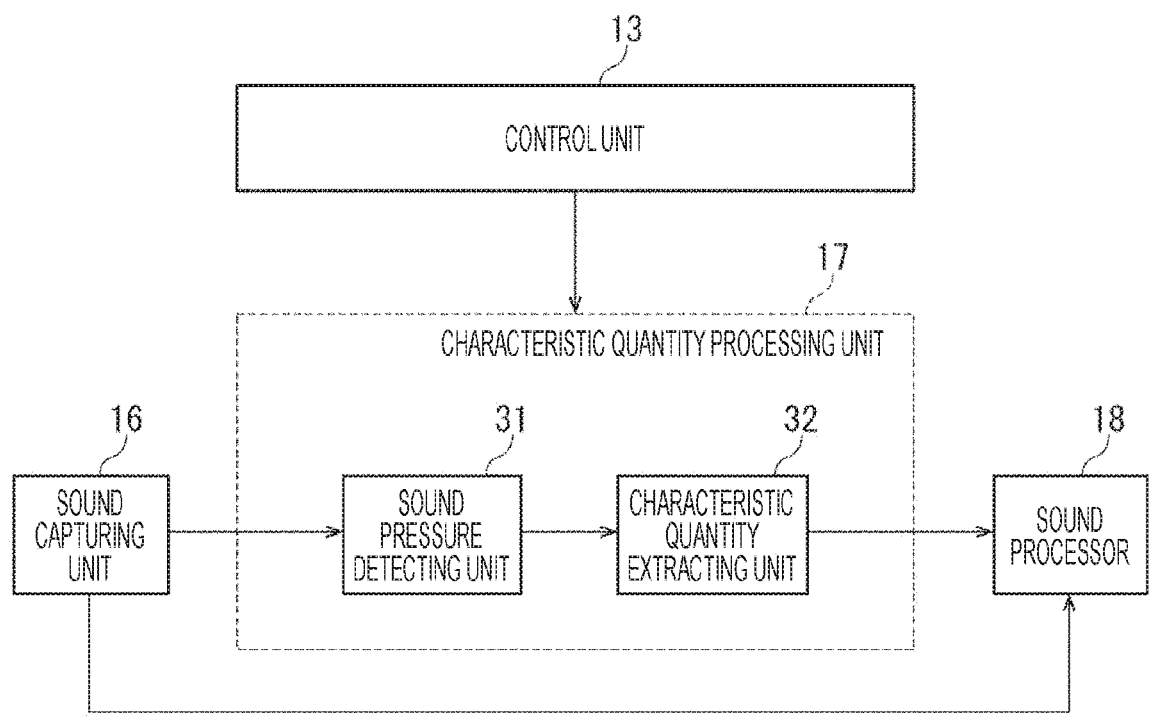
FIG. 2 is a block diagram illustrating an exemplary configuration of a characteristic quantity processing unit.

FIG. 2 is a block diagram illustrating a configuration example of the characteristic quantity processing unit 17 of FIG. 1.

The characteristic quantity processing unit 17 includes a sound pressure detecting unit 31 and a characteristic quantity extracting unit 32.

The sound pressure detecting unit 31 detects the sound pressure which is one of characteristic quantities of the sound data supplied from the sound capturing unit 16. The sound pressure detecting unit 31 supplies a part of the sound data to the characteristic quantity extracting unit 32 on the basis of the detection result of the sound pressure, and discards the rest.

The characteristic quantity extracting unit 32 divides the sound data supplied from the sound pressure detecting unit 31 into sound blocks having a predetermined length and extracts characteristic quantities of each of the sound blocks of more than one dimensions based on one or more viewpoints other than the sound pressure. The characteristic quantity extracting unit 32 further assigns a score based on the extracted characteristic quantities to each of the sound blocks, supplies a part of the sound blocks to the characteristic quantity processing unit 17 on the basis of the scores, and discards the remaining sound blocks.

Exemplary Configuration of Sound Processor

Figure 3:
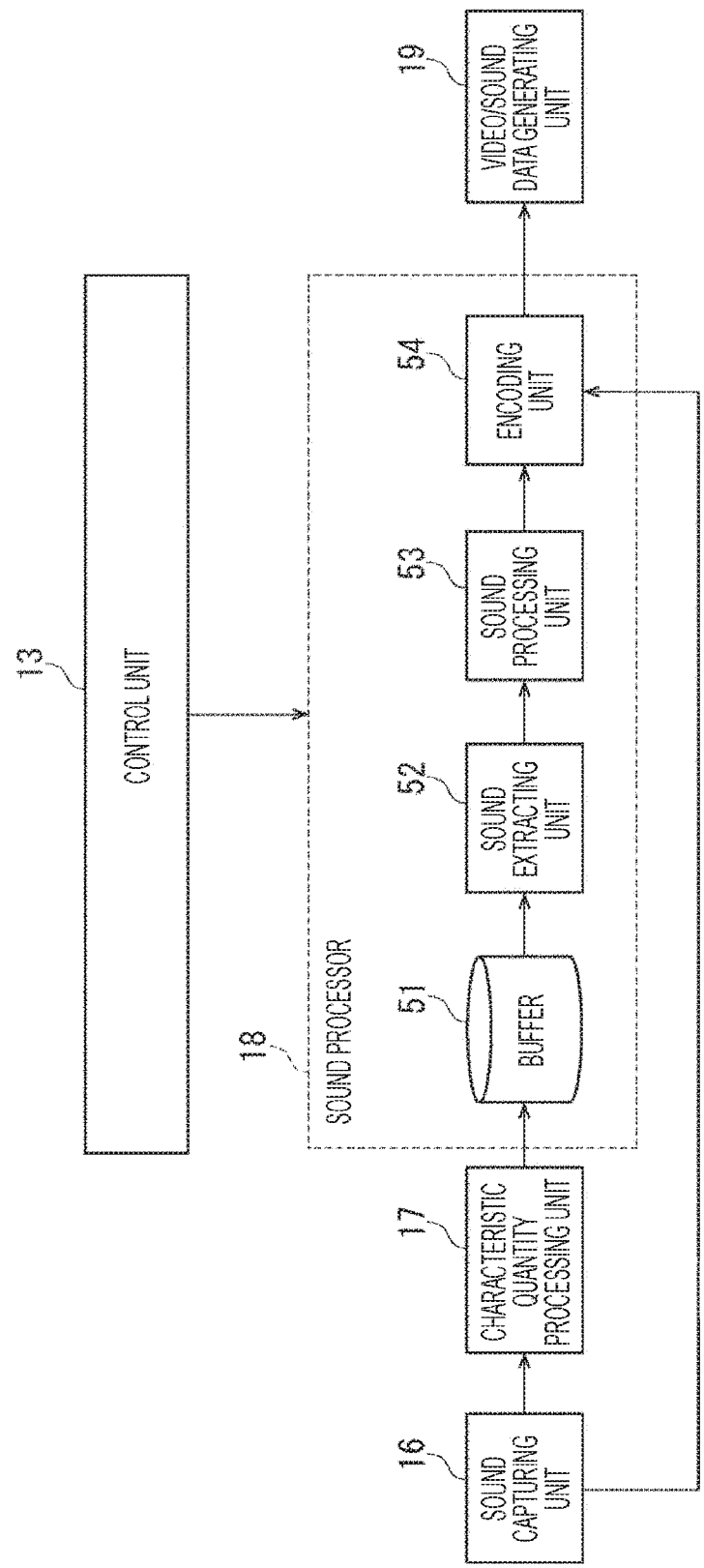
FIG. 3 is a block diagram illustrating an exemplary configuration of a sound processor.

FIG. 3 is a block diagram illustrating a configuration example of the sound processor 18 of FIG. 1.

The sound processor 18 includes a buffer 51, a sound extracting unit 52, a sound processing unit 53, and an encoding unit 54.

The buffer 51 temporarily accumulates sound blocks supplied from the characteristic quantity processing unit 17.

The sound extracting unit 52 extracts some sound blocks from the sound blocks accumulated in the buffer 51 on the basis of a score based on characteristic quantities assigned to each of the sound blocks, and supplies the extracted sound blocks to the sound processing unit 53.

The sound processing unit 53 generates sound data to be recorded by performing various types of processing on the sound blocks extracted by the sound extracting unit 52 and multiplexing the sound blocks into video/sound data. The sound processing unit 53 supplies the generated sound data to the encoding unit 54.

The encoding unit 54 performs predetermined encoding processing on the sound data supplied from the sound capturing unit 16 or the sound processing unit 53 and supplies the encoded sound data to the video/sound data generating unit 19.

Recording Processing

Figure 4:
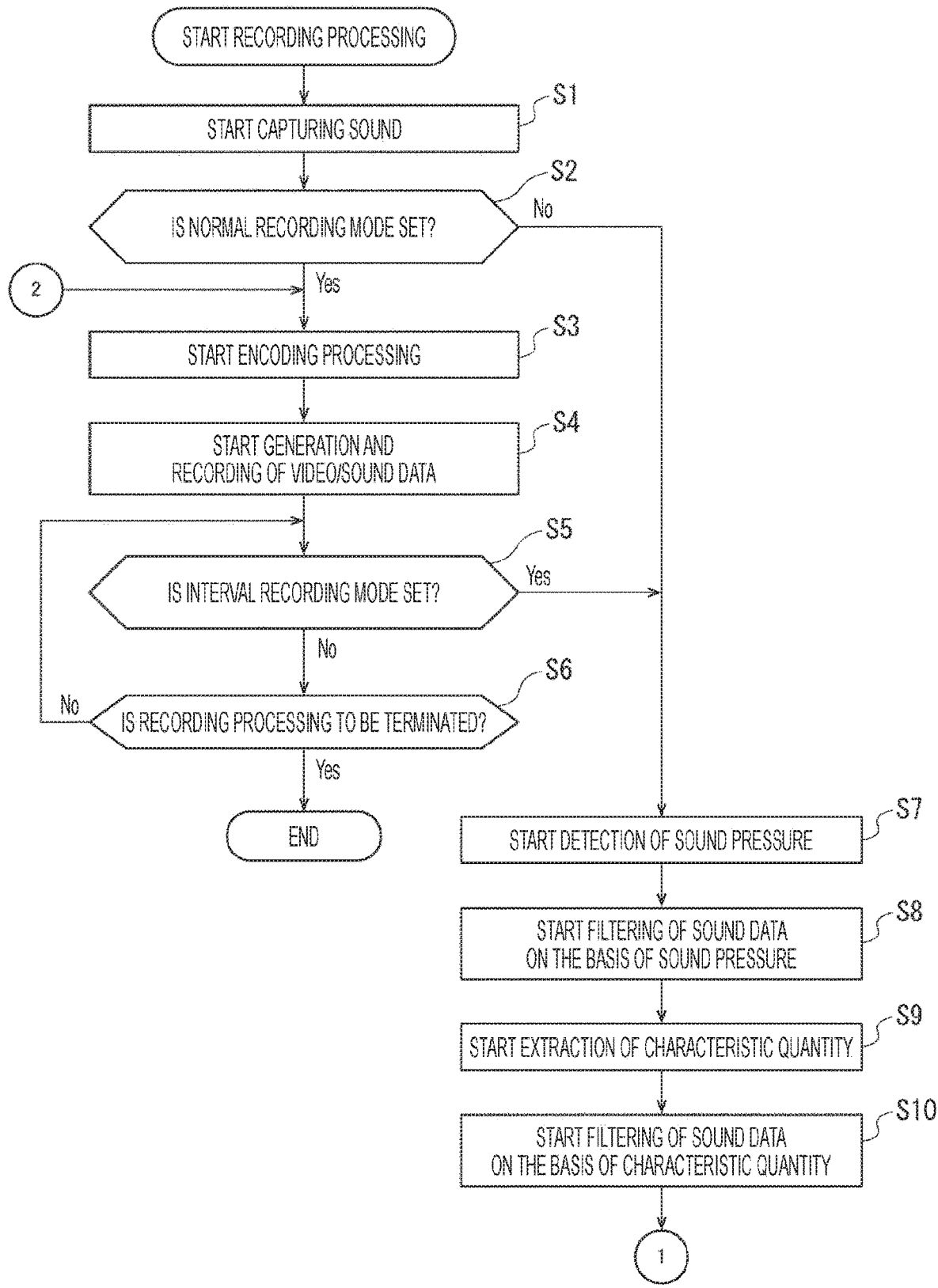
FIG. 4 is a flowchart for explaining recording processing.

Next, recording processing executed by the recording device 10 will be described with reference to flowcharts of FIGS. 4 and 5. Note that, in this example, processing in which the recording device 10 captures and records sound will be mainly described, and other processing will be described as necessary.

This processing is started, for example, when an instruction to start recording processing is input to the control unit 13 via the input unit 11. Alternatively, this processing is started, for example, when the recording processing is scheduled in advance and the start time comes. In addition, either the normal recording mode or the interval recording mode is selected by the start of the recording processing.

In step S1, the sound capturing unit 16 starts capturing sound.

Note that at this time, the image capturing unit 14 starts processing of capturing images at a predetermined frame rate and supplying image data corresponding to the captured images to the image processing unit 15. The frame rate at which images are captured is set to, for example, 30 fps in the case of the normal recording mode and 1 fps in the case of the interval recording mode.

Moreover, the image processing unit 15 starts processing of performing predetermined image processing such as encoding to the image data and supplying the image data to the video/sound data generating unit 19.

Note that either case of the normal recording mode or the interval recording mode, the sound is continuously captured.

In step S2, the control unit 13 determines whether or not the normal recording mode is set. If it is determined that the normal recording mode is set, the processing proceeds to step S3.

In step S3, the recording device 10 starts encoding processing. Specifically, under the control of the control unit 13, the sound capturing unit 16 starts processing of supplying sound data corresponding to the continuously captured sound to the encoding unit 54. The encoding unit 54 starts processing of performing predetermined encoding processing on the sound data and supplying the encoded sound data to the video/sound data generating unit 19.

In step S4, the video/sound data generating unit 19 starts generating and recording video/sound data. For example, the following processing is started.

The video/sound data generating unit 19 generates video data, which is a bit stream of a predetermined format, on the basis of image data of the respective frames supplied from the image processing unit 15. The video/sound data generating unit 19 also converts the sound data supplied from the encoding unit 54 into a bit stream of a predetermined format. The video/sound data generating unit 19 further generates video/sound data by multiplexing the video data and the sound data, and causes the recording unit 20 to record the video/sound data.

In step S5, the control unit 13 determines whether or not the interval recording mode is set. If it is determined that the interval recording mode is not set, the processing proceeds to step S6.

In step S6, the control unit 13 determines whether or not to terminate the recording processing. If it is determined not to terminate the recording processing, the processing returns to step S5.

Thereafter, until it is determined in step S5 that the interval recording mode is set, or until it is determined in step S6 that the recording processing is terminated, the determination processing of steps S5 and S6 is repeatedly executed, and recording of the video/sound data in the normal recording mode is continued.

On the other hand, if, for example, an instruction to stop the recording processing is input via the input unit 11, the control unit 13 determines to terminate the recording processing in step S6. Alternatively, the control unit 13 determines to terminate the recording processing in a case where, for example, a schedule of the recording processing is set in advance, and the end time comes. Then, if it is determined that the recording processing is terminated, the recording processing is terminated.

Alternatively, for example if an instruction to set the interval recording mode is input via the input unit 11, the control unit 13 determines that the interval recording mode has been set in step S5, and the processing proceeds to step S7. This is the case where the normal recording mode is changed to the interval recording mode.

In addition, if it is determined in step S2 that the interval recording mode is set, the processing proceeds to step S7.

In step S7, the recording device 10 starts to detect the sound pressure. Specifically, the sound capturing unit 16 starts processing of supplying sound data indicating continuously captured sound to the sound pressure detecting unit 31 under the control of the control unit 13. The sound pressure detecting unit 31 starts processing of detecting the sound pressure of the sound data supplied from the sound capturing unit 16.

In step S8, the sound pressure detecting unit 31 starts filtering of the sound data based on the sound pressure. For example, the sound pressure detecting unit 31 starts processing of supplying, to the characteristic quantity extracting unit 32, sound data of an interval during which the sound pressure continues to be higher than or equal to a predetermined threshold value for longer than or equal to a predetermined period of time and discarding sound data of other intervals.

The length of this interval is set to, for example, a time period that allows noise of a short period of time included in the sound data to be removed.

This threshold value is set at, for example, a level that allows sound unlikely to contain meaningful sound, that is, sound to be recorded, to be discarded. What is regarded as a meaningful sound varies depending on, for example, a scene to be recorded or a purpose. For example in a case where the growth of a plant is recorded, voices of people around the plant are regarded as meaningful sound. For example in a case where it is desired to record the progress of construction, the sound of the construction site is regarded as meaningful sound. For example in a case where it is desired to record the changing scenery such as the ocean, mountains, or the sky, the sound of the nature, the sound made by animals and insects, and the like are regarded as meaningful sound.

With this filtering processing, the processing of the characteristic quantity extracting unit 32 in the subsequent stage can be reduced.

In step S9, the characteristic quantity extracting unit 32 starts extraction of the characteristic quantity. For example, the characteristic quantity extracting unit 32 starts processing of dividing the sound data supplied from the sound pressure detecting unit 31 into sound blocks having a predetermined length, extracting the characteristic quantity of each of the sound blocks, and scoring each of the sound blocks on the basis of the extracted characteristic quantities.

Here, the type of the characteristic quantity to be extracted is set, for example, on the basis of the type of sound to be recorded. For example in a case where it is desired to record voices of people, a characteristic quantity typical of voices of people is set as an extraction target. Moreover, for example in a case where only the voice of a specific person is to be recorded, a characteristic quantity that allows the voice of each individual to be distinguished is set as an extraction target. Furthermore, for example in a case where only a speech of specific contents is to be recorded, the result of a sentence analysis is extracted as the characteristic quantity.

Meanwhile, the length of a sound block is set to, for example, longer than or equal to a minimum length that allows a person to recognize the sound included in the sound block as meaningful sound.

Note that two or more types of characteristic quantities (two dimensional or above) may be extracted.

Alternatively, for example, the processing of steps S7 and S8 may be omitted to extract the characteristic quantity of all the sound data depending on the type of the sound to be recorded.

In step S10, the characteristic quantity extracting unit 32 starts filtering of sound data on the basis of the characteristic quantity. For example, the characteristic quantity extracting unit 32 starts processing of accumulating sound blocks having a score based on the characteristic quantity higher than or equal to a predetermined threshold value in the buffer 51 together with the score and discarding the other sound blocks without accumulating them in the buffer 51.

This filtering processing allows the capacity of the buffer 51 to be reduced.

In step S11, the control unit 13 determines whether or not it is timing for recording video/sound data. If it is determined that it is not timing for recording video/sound data, the processing proceeds to step S12.

In step S12, the control unit 13 determines whether or not the normal recording mode is set. If it is determined that the normal recording mode is not set, the processing proceeds to step S13.

In step S13, it is determined whether or not the recording processing is terminated like in the processing in step S6, and if it is determined that the recording processing is not terminated, the processing returns to step S11.

Thereafter, the processing of steps S11 to S13 is repeatedly executed until it is determined in step S11 that it is timing for recording video/sound data, it is determined in step S12 that the normal recording mode is set, or it is determined in step S13 that the recording processing is terminated.

On the other hand, if it is determined in step S13 that the recording processing is to be terminated, the processing proceeds to step S14.

In addition, for example if an instruction to set the normal recording mode is input via the input unit 11 in step S12, the control unit 13 determines that the normal recording mode is set, and the processing proceeds to step S14. This is the case where the interval recording mode is changed to the normal recording mode.

Furthermore, for example in the case where recording of video/sound data has never been performed since the start of the recording processing in the interval recording mode, the control unit 13 determines in step S11 that it is timing for recording video/sound data when a predetermined period of time has elapsed from the start of the recording processing in the interval recording mode. Alternatively, for example in the case where recording of video/sound data has been performed once or more than once since the start of the recording processing in the interval recording mode, the control unit 13 determines that it is timing for recording video/sound data when a predetermined period of time has elapsed from the most recent recording of video/sound data. Then, f it is determined that it is timing for recording video/sound data, the processing proceeds to step S11.

As a result, video/sound data is periodically generated and recorded at predetermined intervals during a period in which the recording processing in the interval recording mode continues. The interval may be set by a user, or may be set automatically by the recording device 10, for example.

In addition, the shorter the interval for recording video/sound data becomes, the smaller a time difference between the video data and the sound data can be, and the higher the correlation between the video data and the sound data can be. This also allows the capacity of the buffer 51 to be reduced and to disperse the processing of the sound processor 18. On the other hand, if the interval for recording video/sound data is too short, there are cases where no meaningful sound can be recorded such as that the sound is too short or interrupted halfway, for example.

Meanwhile, the determination processing in step S11 can be omitted. If this determination processing is omitted, video/sound data is collectively generated and recorded at the end of the recording processing in the interval recording mode.

In step S14, the control unit 13 calculates video recording time. Specifically, the control unit 13 calculates the length of the period from the start of the recording processing in the interval recording mode to the present time (hereinafter referred to as recording target period) in a case where recording of video/sound data has never been performed since the start of the recording processing in the interval recording mode. On the other hand, in the case where recording of video/sound data has been performed more than or equal to once since the start of the recording processing in the interval recording mode, the control unit 13 calculates the length of the period (recording target period) from the most recent recording of video/sound data to the present time.

Then, the control unit 13 calculates the length of image data captured within the recording target period as the video recording time. For example, in the case where the length of the recording target period is one hour, images are captured at a frame rate of 1 fps, and the length of image data of one frame is 33 ms, the video recording time obtained is 118.8 seconds (=33 ms×3600 frames).

In step S15, the sound extracting unit 52 extracts sound blocks on the basis of the characteristic quantity. For example, the sound extracting unit 52 combines sound blocks that are continuous in terms of time among the sound blocks accumulated in the buffer 51 into one sound block. The sound extracting unit 52 further calculates, for example, an average value of scores of the respective sound blocks as a score of the sound blocks integrated into one.

Then, after performing the above processing of combining into one block, the sound extracting unit 52 extracts sound blocks having a score higher than or equal to a predetermined threshold value from the sound blocks accumulated in the buffer 51. The sound extracting unit 52 supplies the extracted sound blocks to the sound processing unit 53 together with the scores. The sound extracting unit 52 also erases the sound blocks accumulated in the buffer 51 and resets the buffer 51.

In step S16, the sound processing unit 53 generates sound data having the same length as the video recording time on the basis of the extracted sound blocks.

For example, the sound processing unit 53 arranges and connects the extracted sound blocks in the order of time of capture. At this time, the sound processing unit 53 performs, for example, fade processing (fade in and fade out) on each of the sound blocks so that a user does not feel any discomfort when listening to the sound blocks.

In addition, in a case where the total time of the extracted sound blocks is longer than the video recording time, the sound processing unit 53 compresses the sound data in the time direction so that the connected sound data has the same length as the video recording time. For example, the sound processing unit 53 increases the reproduction speed of the sound blocks by speech speed conversion. Note that the maximum reproduction speed is limited to a level at which a person can hear a conversation (e.g., double speed). Furthermore, the sound processing unit 53 superimposes adjacent sound blocks without any sense of discomfort by cross-fade processing, for example.

Note that in a case where the length of the sound data is still longer than the video recording time even after the above processing is performed, the sound processing unit 53 discards sound blocks in descending order of the score, for example, to adjust the length of the sound data to be equal to the video recording time.

On the other hand, in a case where the total time of the extracted sound blocks is shorter than the video recording time, the sound processing unit 53 adjusts the length of the sound data to the video recording time by inserting one or more silent sound blocks (hereinafter referred to as silent blocks). At this time, for example, the insertion position of the silent blocks is set so that the time difference, between the sound blocks and the image data captured close to the time when the sound blocks have been captured, becomes small.

The sound processing unit 53 also performs processing such as gain adjustment and noise removal of the sound data as required.

Then, the sound processing unit 53 supplies the generated sound data to the encoding unit 54.

In step S17, the encoding unit 54 performs encoding processing. Specifically, the encoding unit 54 performs predetermined encoding processing on the sound data supplied from the sound processing unit 53, and supplies the encoded sound data to the video/sound data generating unit 19.

In step S18, the video/sound data generating unit 19 generates and records video/sound data. For example, the video/sound data generating unit 19 generates video data, which is a bit stream of a predetermined format, on the basis of the image data (intermittent image data) of the respective frames captured within the recording target period. The video/sound data generating unit 19 also converts the sound data supplied from the encoding unit 54 into a bit stream of a predetermined format. At this time, time information (for example, timestamp or the like) of the video data and the sound data is modified in such a manner that the intermittently captured images are continuously reproduced in the same manner as video data and sound data recorded in the normal recording mode are. The video/sound data generating unit 19 further generates video/sound data by multiplexing the video data and the sound data, and causes the recording unit 20 to record the video/sound data.

In step S19, whether or not to terminate the recording processing is determined like in the processing of step S6, and if it is determined that the recording processing is not terminated, the processing proceeds to step S20.

In step S20, the control unit 13 determines whether or not the interval recording mode is set. If it is determined that the interval recording mode is set, the processing returns to step S11, and the processing after step S11 is executed. This is a case where the video/sound data is generated and recorded at predetermined timing during the recording processing in the interval recording mode, and the recording processing in the interval recording mode further is continued.

On the other hand, if it is determined in step S20 that the normal recording mode is set, the processing returns to step S3, and the processing after step S3 is executed. This is a case where the interval recording mode is changed to the normal recording mode, and thereafter recording processing in the normal recording mode is started.

Moreover, if it is determined in step S19 that the recording processing is to be terminated, the recording processing is terminated.

As described above, meaningful sound with respect to the intermittent images can be recorded.

Figure 6:
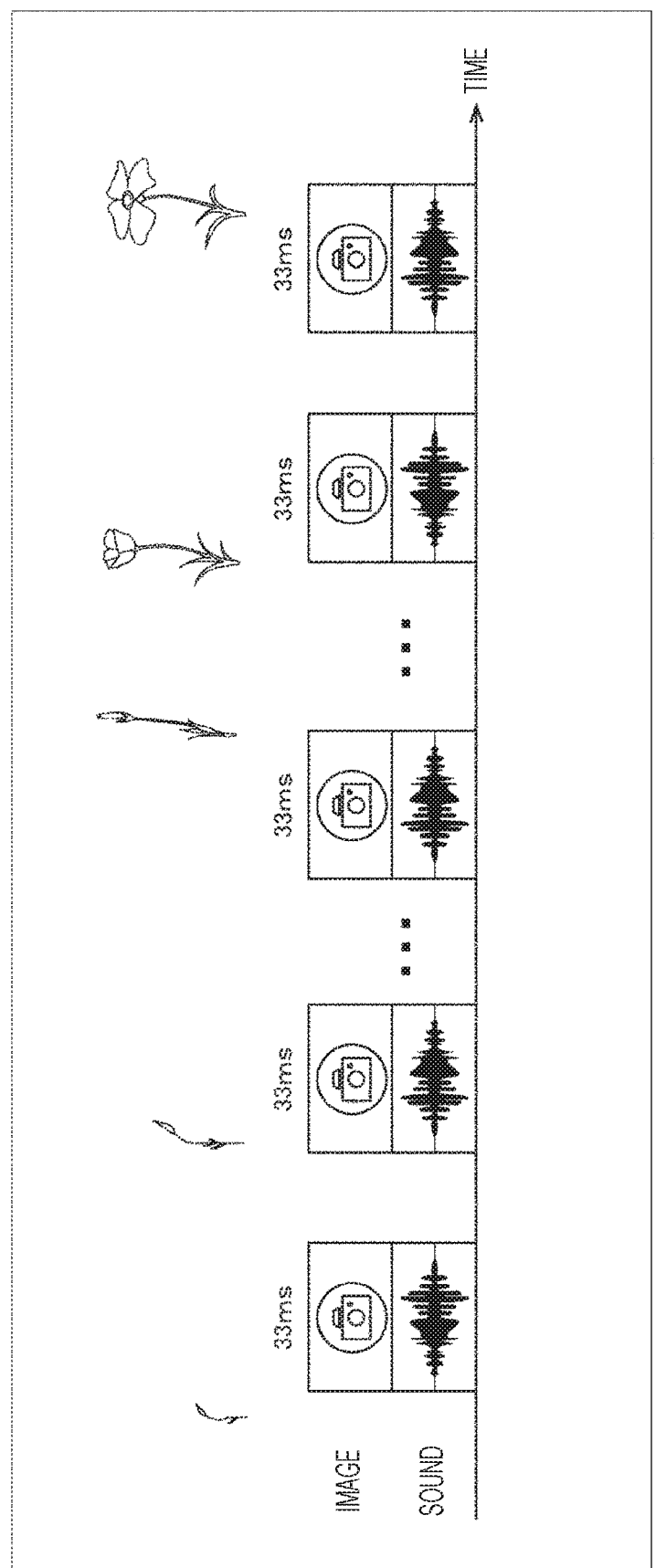
FIG. 6 is a diagram for explaining a case where images and the sound are simultaneously and intermittently captured.

For example, FIG. 6 illustrates an example of the timing at which images and the sound are captured when the images and the sound are simultaneously captured in a case where the growth of a flower is intermittently recorded. The first row in the drawing illustrates how the flower is growing, the second row illustrates the timing of capturing an image by a frame including a drawing of a camera, and the third row illustrates the timing of capturing the sound by a frame including a waveform diagram.

For example, an image having a length of 33 ms is captured and recorded at predetermined intervals. In synchronization with the image, the sound having a length of 33 ms is also captured and recorded at predetermined intervals. However, it is not always the case that meaningful sound flows in the background when an image is being captured.

Moreover, it is difficult for a person to recognize sound having a length of 33 ms as meaningful sound.

Figure 7:
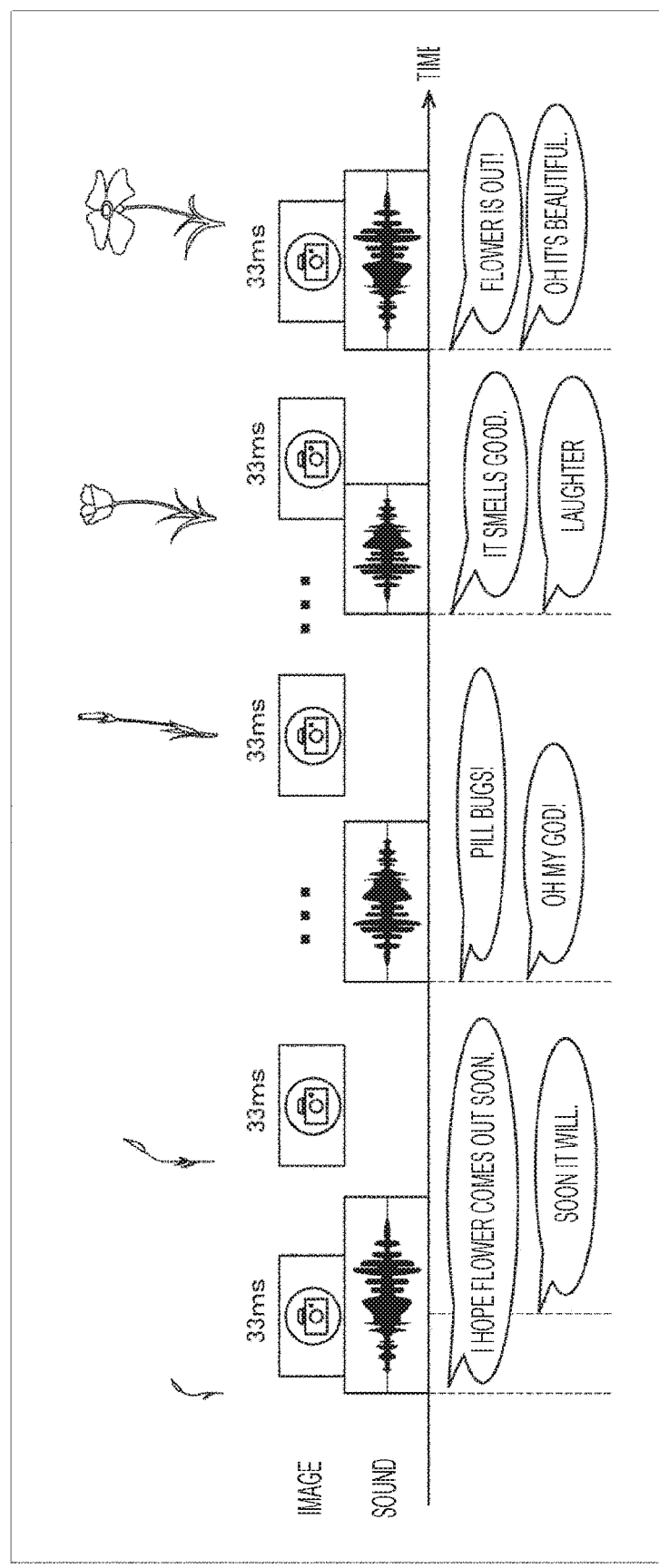
FIG. 7 is a diagram for explaining a case where images and the sound are captured by using the present technology.

Meanwhile, FIG. 7 illustrates, in a similar manner to that in FIG. 6, an example of the timing at which images and the sound are captured using the present technology in a case where the growth of a flower is intermittently recorded. Note that, in FIG. 7, specific examples of the sound to be captured are illustrated below the row indicating the timing of capturing the sound.

In a case where the present technology is used, the value of the video/sound data is improved since, for example, only meaningful sound such as voices of children observing the flower is extracted and recorded without synchronizing with the capture of an image. Moreover, an enhanced realistic feeling is obtained since the extracted sound is reproduced together with a video including images of a plurality of frames having been captured intermittently.

Furthermore, an increase in the capacity of video/sound data is prevented since only meaningful sound is recorded, and unnecessary sound is discarded.

In addition, the video/sound data recorded in the interval recording mode can be reproduced by a similar manner to that of video/sound data recorded in the normal recording mode without being dependent on the reproduction environment or the device.

As described above, switching between the normal recording mode and the interval recording mode can also be performed seamlessly. Furthermore, even when the recording mode is switched halfway, continuous reproduction can be performed without performing any special processing during the reproduction.

Furthermore, by modifying the type of characteristic quantity to be extracted, it becomes possible to appropriately extract meaningful sound suitable for a scene to be recorded or a purpose.

Note that a user does not feel substantial discomfort even when a slight time difference occurs between the video and the sound since the video is substantially fast-forwarding reproduced in a case where the intermittently captured images are continuously reproduced. Furthermore, even when the reproduction speed of the sound is increased by speech speed conversion, a user does not feel substantial discomfort.

2. Second Embodiment

Next, a second embodiment of the present technology will be described with reference to FIG. 8.

Exemplary Configuration of Editing Device

Figure 8:
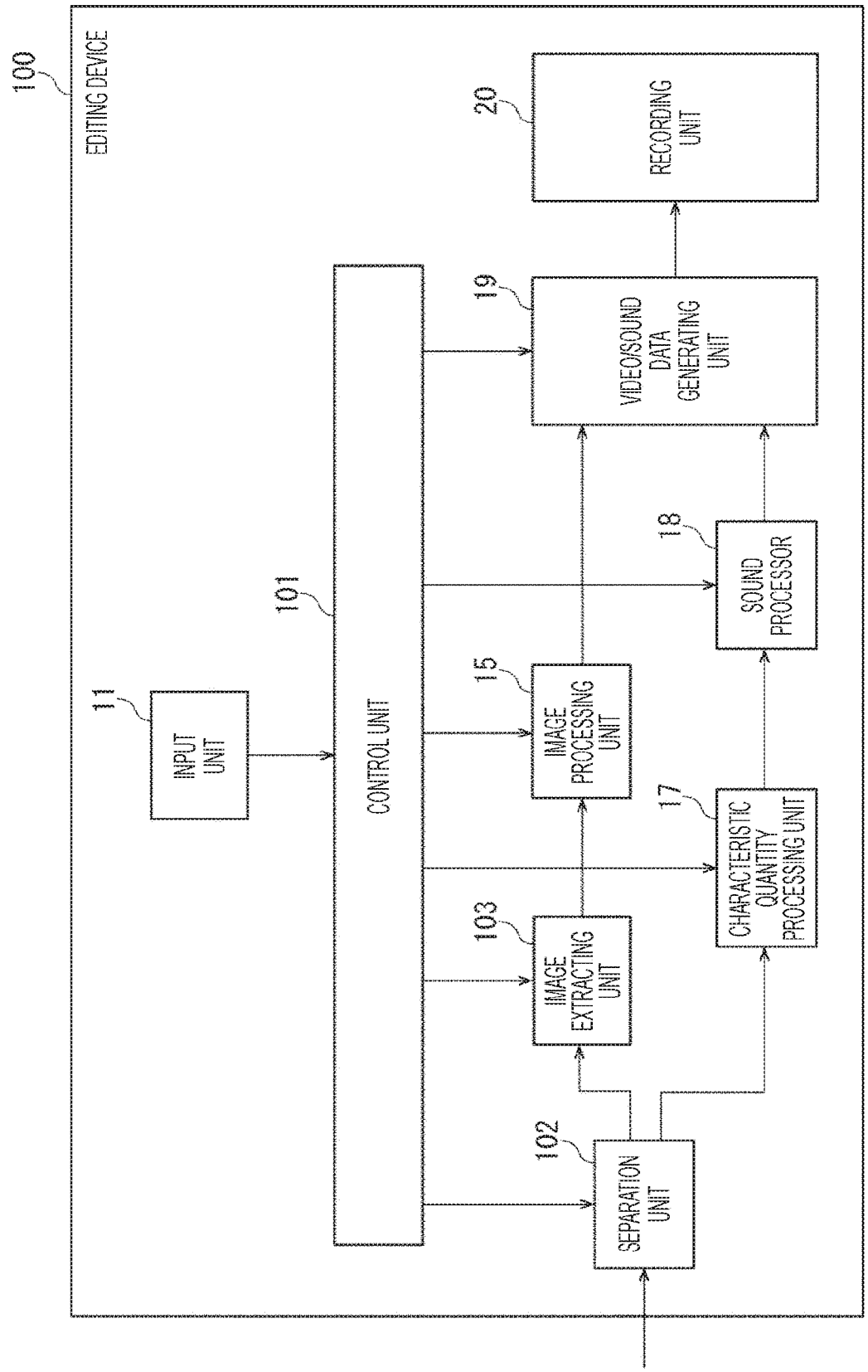
FIG. 8 is a block diagram illustrating one embodiment of an editing device to which the present technology is applied.

FIG. 8 is a block diagram illustrating a configuration example of an editing device 100 which corresponds to a second embodiment of a data processing device to which the present technology is applied. Note that, in the drawing, a component corresponding to that of the recording device 10 in FIG. 1 is denoted by the same symbol, and description thereof will be omitted.

The editing device 100 generates video/sound data, in which images are intermittently recorded, from video/sound data in which images are consecutively recorded at a normal frame rate, for example.

The editing device 100 differs from the recording device 10 in that a control unit 101 is included instead of the control unit 13, that a separation unit 102 and an image extracting unit 103 are added, and that the sensor unit 12, the image capturing unit 14, and the sound capturing unit 16 are deleted.

The control unit 101 includes, for example, various processors such as a CPU, and controls each of the units of the editing device 100.

The separation unit 102 separates video data and sound data which are multiplexed into video/sound data that is supplied from the outside. Then, the separation unit 102 supplies the video data to the image extracting unit 103 and supplies the sound data to a characteristic quantity processing unit 17.

The image extracting unit 103 extracts image data of a plurality of frames included in the video data at predetermined intervals, and supplies the extracted image data to an image processing unit 15. As a result, intermittent image data, similar to the image data intermittently captured in the interval imaging mode by the recording device 10 described above, is supplied to the image processing unit 15. Then the image processing unit 15 performs predetermined image processing on each piece of the image data and supplies the image data to a video/sound data generating unit 19.

The characteristic quantity extracting unit 17 and the sound processor 18 generate sound data by processing similar to that in the interval imaging mode of the recording device 10 described above on the basis of the sound data supplied from the separation unit 102, and supply the sound data to the video/sound data generating unit 19.

The video/sound data generating unit 19 generates video data on the basis of the intermittent image data by processing similar to that in the interval imaging mode of the recording device 10 described above. Then, the video/sound data generating unit 19 generates video/sound data on the basis of the video data and the sound data, and causes the recording unit 20 to record the video/sound data.

In this manner, video/sound data in which images are intermittently recorded is generated from the video/sound data in which images are consecutively recorded. In addition, sound data including meaningful sound is extracted from sound data that is already recorded, and recorded in the video/sound data.

3. Variations

Variations of the embodiments of the technology according to the present disclosure described above will be described below.

Variation of System Configuration

In the above description, the examples in which each of the recording device 10 of FIG. 1 and the editing device 100 of FIG. 8 individually performs all the processing solely has been illustrated; however, the processing may be performed by a plurality of devices (alternatively, a plurality of LSIs, platforms, etc.) in a distributed manner. In a case where the processing is performed by a plurality of devices in a distributed manner, the devices may be directly connected to each other or indirectly connected via a network or the like. Alternatively, data exchange between devices may be performed via a recording medium or the like without directly or indirectly connecting the devices.

For example, the image capturing unit 14 and the sound capturing unit 16 may be provided outside the recording device 10. For example, an imaging device including the image capturing unit 14 and the sound capturing unit 16 may be installed at a place desirable for capturing images, and imaging may be performed always in the interval imaging mode, and the captured image data and sound data may be transmitted to the recording device 10. This allows the load of the imaging device to be reduced and the power consumption to be reduced. Moreover, the amount of data transmitted between the imaging device and the recording device 10 is reduced, thereby allowing the transmission capacity of the transmission path between the imaging device and the recording device 10 to be reduced.

Alternatively, for example, the video/sound data generating unit 19 and the recording unit 20 may be provided outside the recording device 10. In this case, the transmission of image data and sound data from the recording device 10 to a subsequent device including the video/sound data generating unit 19 and the recording unit 20 can be performed intermittently or at a low bit rate, thereby allowing the transmission capacity of the transmission path between the recording device 10 and the subsequent device to be further reduced.

Further alternatively, for example, the recording unit 20 may be provided outside the recording device 10 or the editing device 100. For example, the recording device 10 or the editing device 100 may supply generated video/sound data to an external device (e.g. local server, smartphone, etc.) and record the generated video/sound data therein, or may supply the video/sound data to a server providing a cloud service or the like via a network and record the generated video/sound data therein.

For example, it is also possible to transmit image data and sound data, to which a score based on the characteristic quantity is assigned (hereinafter referred to as scored sound data), from the recording device 10 to an external device or server, to externally generate sound data for recording, and to generate video/sound data including the sound data.

It is also possible, for example, to transmit image data and scored sound data to a plurality of devices and to generate different sound data in each of the devices to generate video/sound data including different sound data. For example, image data and scored sound data may be transmitted to a plurality of smartphones, and sound data may be extracted and recorded in each of the smartphones on the basis of the voice of the owner of smartphone.

Variations of Processing

Figure 5:
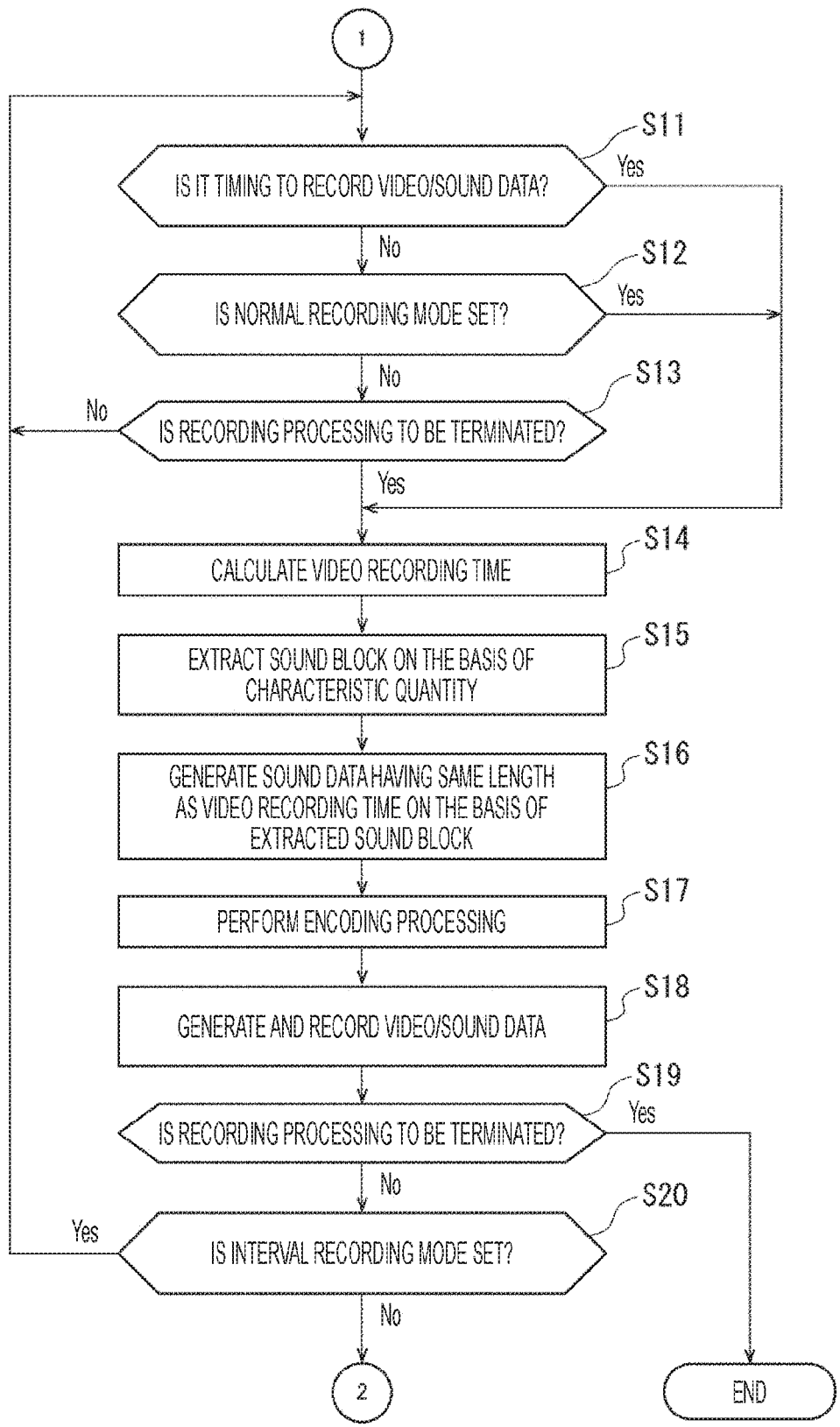
FIG. 5 is a flowchart for explaining recording processing.

For example in a case where the period for recording video/sound data in the interval recording mode or the interval for generating and recording video/sound data in the interval recording mode (hereinafter referred to as recording interval) is predetermined, the video recording time calculated in the processing of step S14 in FIG. 5 is determined in advance. Then, the maximum value (hereinafter referred to as sound recordable time) of time, before compression in the time direction, of sound data that can be multiplexed with video data of the video recording time is determined in advance in consideration of speech speed conversion, cross-fade processing, and the like. In this case, for example in a case where the total time of sound blocks accumulated in the buffer 51 is likely to exceed the sound recordable time, the necessary capacity of the buffer 51 can be reduced by erasing sound blocks in the ascending order of scores in such a manner that the total time of sound blocks does not exceed the sound recordable time.

Furthermore, for example, processing or encoding may be performed in advance on sound blocks having high scores that are speculated to be reliably extracted and recorded on the basis of time of unrecorded video data, the total time of sound blocks accumulated in the buffer 51, and scores of the sound blocks. This allows the capacity of the buffer 51 to be reduced.

Alternatively, for example, sound blocks having high scores may be encoded substantially in real time, be converted into a predetermined format, and be recorded in the recording unit 20. This allows the capacity of the buffer 51 to be reduced. Note that in a case where the time of the final sound data is longer than the video recording time, for example, the length of the sound data can be adjusted by decoding the sound around discontinuous points of the sound data and then re-encoding the sound while performing cross-fading. On the other hand, in a case where the time of the final sound data is shorter than the video recording time, for example, the length of the sound data can be adjusted by inserting silent blocks.

Meanwhile, for example in a case where the recording interval is predetermined in the interval recording mode, the processing of the characteristic quantity processing unit 17 and the sound processor 18 can be performed in parallel, thereby allowing the processing time to be shortened.

Furthermore, the example in which sound data to be recorded is extracted on the basis of the characteristic quantity extracted from the sound data has been illustrated in the above description; however, sound data to be recorded may be extracted on the basis of a characteristic quantity other than the characteristic quantity extracted from the sound data.

For example, it is possible to extract sound data to be recorded on the basis of the characteristic quantity based on time-series sensor data detected, in parallel with the sound capturing, by the various sensors included in the sensor unit 12. For example, it is possible to extract sound data of a period in which the presence of a person has been detected in the surroundings by the motion sensor. It is also possible to extract sound data, for example, of a period in which vibration higher than or equal to a predetermined threshold value has been detected by the vibration sensor.

Note that it is possible to use both the characteristic quantity extracted from sound data and another characteristic quantity.

It is also possible that, for example, the characteristic quantity extracting unit 32 extracts a characteristic quantity from sensor data supplied from the sensor unit 12.

It is also possible that, for example, the image capturing unit 14 of FIG. 1 captures images in the interval recording mode at the same frame rate as that in the normal recording mode, extracts image data at predetermined intervals, and supplies the image data to the image processing unit 15.

Exemplary Applications of Present Technology

The present technology is applicable to a device (for example, an image-capturing device, a recording device, an editing device, etc.) or a system including a function of generating sound data to be reproduced together with video data based on intermittent images.

Note that video data targeted by the present technology may be video data based on intermittently captured images or video data based on images extracted from consecutively captured images. Incidentally, the time interval between intermittent images may be fixed or variable. For example, video data based on images captured intermittently in accordance with the motion of a subject is also targeted by the present technology.

4. Others

Exemplary Configuration of Computer

The series of processing described above may be executed by hardware or may be executed by software. In a case where the series of processing is executed by software, a program implementing the software is installed in a computer. The computer here includes, for example, a computer incorporated in dedicated hardware, or a generic personal computer capable of executing various functions by installing various programs.

FIG. 9 is a block diagram illustrating an exemplary configuration of hardware of a computer that executes the series of processing described above by a program.

In the computer, a central processing unit (CPU) 401, a read only memory (ROM) 402, and a random access memory (RAM) 403 are connected to each other by a bus 404.

The bus 404 is further connected with an input/output interface 405. The input/output interface 405 connected with an input unit 406, an output unit 407, a recording unit 408, a communication unit 409, and a drive 410.

The input unit 406 includes an input switch, a button, a microphone, an imaging element, or the like. The output unit 407 includes a display, a speaker, or the like. The recording unit 408 includes a hard disk, a nonvolatile memory, or the like. The communication unit 409 includes a network interface or other components. The drive 410 drives a removable recording medium 411 such as a magnetic disk, an optical disk, a magneto-optical disk, or a semiconductor memory.

In the computer configured in the above manner, the series of processing described above is performed by the CPU 401 by, for example, loading a program stored in the recording unit 408 to the RAM 403 via the input/output interface 405 and the bus 404 and executing the program.

The program executed by the computer (CPU 401) can be provided by being recorded in a removable recording medium 411 as a package medium or the like, for example. Alternatively, the program may be provided via a wired or wireless transmission medium such as a local area network, the Internet, and digital satellite broadcasting.

In the computer, the program can be installed in the recording unit 408 via the input/output interface 405 by mounting the removable recording medium 411 to the drive 410. Moreover, the program can be received by the communication unit 409 via a wired or wireless transmission medium and be installed in the recording unit 408. Alternatively, the program can be installed in advance in the ROM 402 or the recording unit 408.

Note that the program executed by the computer may perform processing in time series along the order described herein or may perform processing in parallel or at necessary timing such as when a call is made.

Note that, in the present description, a system means a collection of a plurality of components (such as devices, and modules (parts)) regardless of whether or not all the components are in the same housing. Therefore, a plurality of devices accommodated in separate housings and connected via a network and a device in which a plurality of modules is accommodated in one housing are both deemed as a system.

Moreover, embodiments of the present technology are not limited to the aforementioned embodiments and may include various modifications within a scope not departing from the principles of the present technology.

For example, the present technology may employ cloud computing in which one function is processed by a plurality of devices in a shared and collaborative manner via a network.

Moreover, each of the steps described in the above flowcharts can be executed by a single device or by a plurality of devices in a shared manner.

Furthermore, in a case where a plurality of types processing is included in one step, the plurality of types of processing included in that one step can be executed by a single device or by a plurality of devices in a shared manner.

Exemplary Combinations of Configurations

The present technology may employ configurations as follows.

(1)

A data processing device including:

a sound extracting unit that extracts one or more sound blocks to be reproduced together with video data based on the plurality of images, on the basis of a predetermined characteristic quantity from first sound data corresponding to sound captured within a first period in which a plurality of intermittent images has been captured.

(2)

The data processing device according to item (1), further including:

a sound processing unit that processes the extracted sound blocks to generate second sound data having a same length as that of the video data.

(3)

The data processing device according to item (2), in which in a case where a plurality of the sound blocks is extracted, the sound processing unit arranges and connects the plurality of sound blocks in a time-series order.

(4)

The data processing device according to item (3), in which the sound processing unit performs fade processing on each of the sound blocks.

(5)

The data processing device according to item (4), in which the sound processing unit performs cross-fade processing between adjacent blocks of the sound blocks in a case where a total time length of the extracted sound blocks is longer than a time length of the video data.

(6)

The data processing device according to any one of items (2) to (5), in which the sound processing unit performs speech speed conversion of the sound block in a case where a total time length of the extracted sound blocks is longer than a time length of the video data.

(7)

The data processing device according to any one of items (2) to (6), in which the sound processing unit inserts a silent sound block in a case where a total time length of the extracted sound blocks is shorter than a time length of the video data.

(8)

The data processing device according to any one of items (2) to (7), further including:

a video/sound data generating unit that multiplexes the video data and the second sound data to generate video/sound data.

(9)

The data processing device according to item (8), in which the video/sound data generating unit modifies time information of the video data and the sound data in such a manner that the plurality of images is reproduced continuously.

(10)

The data processing device according to any one of items (1) to (9), further including:

a characteristic quantity extracting unit that extracts the characteristic quantity.

(11)

The data processing device according to any one of items (1) to (10), in which the characteristic quantity includes at least one of a characteristic quantity of the first sound data or a characteristic quantity based on data detected by a predetermined sensor within the first period.

(12)

The data processing device according to any one of items (1) to (11), in which the sound extracting unit extracts, for every second period of a predetermined length, one or more of the sound blocks from sound data corresponding to sound captured within the second period on the basis of the characteristic quantity, the one or more sound blocks being to be reproduced together with video data based on a plurality of intermittent images captured within the second period.

(13)

The data processing device according to any one of items (1) to (12), further including:

an image capturing unit that captures an image; and a sound capturing unit that captures sound.

(14)

A data processing method including:

a sound extracting step of extracting one or more sound blocks to be reproduced together with video data based on the plurality of images, on the basis of a predetermined characteristic quantity from sound data corresponding to sound captured within a period in which a plurality of intermittent images has been captured.

(15)

A program for causing a computer to execute processing including:

a sound extracting step of extracting one or more sound blocks to be reproduced together with video data based on the plurality of images, on the basis of a predetermined characteristic quantity from sound data corresponding to sound captured within a period in which a plurality of intermittent images has been captured.

(16)

A data processing system including:

a sound extracting unit that extracts one or more sound blocks to be reproduced together with video data based on the plurality of images, on the basis of a predetermined characteristic quantity from first sound data corresponding to sound captured within a period in which a plurality of intermittent images has been captured;

a sound processing unit that processes the extracted sound blocks to generate second sound data having a same length as that of the video data; and a video/sound data generating unit that multiplexes the video data and the second sound data to generate video/sound data, in which the sound extracting unit, the sound processing unit, and the video/sound data generating unit are distributed to multiple devices.

(17)

The data processing system according to item (16), further including:

an image capturing unit that captures an image; and a sound capturing unit that captures sound.

REFERENCE SIGNS LIST

10 Recording device
12 Sensor unit
13 Control unit
14 Image capturing unit
15 Image processing unit
16 Sound capturing unit
17 Characteristic quantity processing unit
18 Sound processor
19 Video/sound data generating unit
31 Sound pressure detecting unit
32 Characteristic quantity extracting unit
51 Buffer
52 Sound extracting unit
53 Sound processing unit
54 Encoding unit
100 Editing device
101 Control unit
102 Separation unit
103 Image extracting unit

The invention claimed is:

1. A data processing device, comprising:
a sound extracting unit configured to extract, based on a first characteristic quantity, at least a first sound block from first sound data, wherein
the extracted at least first sound block is reproducible together with first video data based on a plurality of images, and
the first sound data corresponds to sound captured within a first period in which a first plurality of intermittent images is captured.

2. The data processing device according to claim 1, further comprising a sound processing unit configured to process the extracted at least first sound block to generate second sound data having a same length as that of the first video data.

3. The data processing device according to claim 2, wherein
the sound extracting unit is further configured to extract a plurality of sound blocks including the at least first sound block from the first sound data, and
the sound processing unit is further configured to arrange and connect the extracted plurality of sound blocks in a time-series order.

4. The data processing device according to claim 3, wherein
the sound processing unit is further configured to execute a fade process on each of the extracted plurality of sound blocks.

5. The data processing device according to claim 4, wherein
the sound processing unit is further configured to execute a cross-fade process between adjacent blocks of the extracted plurality of sound blocks based on a total time length of the extracted plurality of sound blocks that is longer than a time length of the first video data.

6. The data processing device according to claim 2, wherein
the sound extracting unit is further configured to extract a plurality of sound blocks including the at least first sound block from the first sound data, and
the sound processing unit is further configured to execute a speech speed conversion of the at least first sound block based on a total time length of the extracted plurality of sound blocks that is longer than a time length of the first video data.

7. The data processing device according to claim 2, wherein
the sound extracting unit is further configured to extract a plurality of sound blocks including the at least first sound block from the first sound data, and
the sound processing unit is further configured to insert a silent sound block based on a total time length of the extracted plurality of sound blocks that is shorter than a time length of the first video data.

8. The data processing device according to claim 2, further comprising a video/sound data generating unit configured to multiplex the first video data and the second sound data to generate video/sound data.

9. The data processing device according to claim 8, wherein
the video/sound data generating unit is further configured to modify time information of the first video data and the second sound data such that the plurality of images is reproduced continuously.

10. The data processing device according to claim 1, further comprising a characteristic quantity extracting unit configured to extract the first characteristic quantity.

11. The data processing device according to claim 1, wherein
the first characteristic quantity includes at least one of a second characteristic quantity of the first sound data or a third characteristic quantity, and
the third characteristic quantity is based on data detected by a specific sensor within the first period.

12. The data processing device according to claim 1, wherein
the sound extracting unit is further configured to extract, for every second period of a specific length, at least a second sound block from second sound data based on the first characteristic quantity,
the second sound data corresponds to sound captured within the second period, and
the at least second sound block is reproducible together with second video data based on a second plurality of intermittent images captured within the second period.

13. The data processing device according to claim 1, further comprising:
an image capturing unit configured to capture the first plurality of intermittent images; and
a sound capturing unit configured to capture the sound within the first period.

14. A data processing method, comprising:
extracting, based on a characteristic quantity, at least one sound block from sound data, wherein
the extracted at least one sound block is reproducible together with video data based on a plurality of images, and
the sound data corresponds to sound captured within a period in which a plurality of intermittent images is captured.

15. A non-transitory computer-readable medium having stored thereon computer-executable instructions which, when executed by a processor, cause the processor to execute operations, the operations comprising:
extracting, based on a characteristic quantity, at least one sound block from sound data, wherein
the extracted at least one sound block is reproducible together with video data based on a plurality of images, and
the sound data corresponds to sound captured within a period in which a plurality of intermittent images is captured.

16. A data processing system, comprising:
a sound extracting unit configured to extract, based on a characteristic quantity, at least one sound block from first sound data, wherein
the extracted at least one sound block is reproducible together with video data based on a plurality of images, and
the first sound data corresponds to sound captured within a period in which a plurality of intermittent images is captured;
a sound processing unit configured to process the extracted at least one sound block to generate second sound data having a same length as that of the video data; and
a video/sound data generating unit configured to multiplex the video data and the second sound data to generate video/sound data, wherein
the sound extracting unit, the sound processing unit, and the video/sound data generating unit are distributed to multiple devices.

17. The data processing system according to claim 16, further comprising:
an image capturing unit configured to capture the plurality of intermittent images; and
a sound capturing unit configured to capture the sound.

* * * * *